United States Patent

Jenvey

[15] 3,661,032
[45] May 9, 1972

[54] STEERING ARRANGEMENTS FOR MOTOR VEHICLES

[72] Inventor: Leslie Richard Jenvey, Reading, England
[73] Assignee: Adwest Engineering Limited, Reading, England
[22] Filed: Nov. 10, 1969
[21] Appl. No.: 875,408

[52] U.S. Cl. ..............................................74/498
[51] Int. Cl. .........................................B62d 3/12, B62d 3/12
[58] Field of Search ................74/498, 508, 422; 280/97, 96

[56] References Cited

UNITED STATES PATENTS

| 698,344 | 4/1902 | Warner | 74/422 |
| 2,525,805 | 10/1950 | Kirkpatrick | 74/422 X |
| 2,867,284 | 1/1959 | Hruska | 280/96 X |
| 3,347,109 | 10/1967 | Adams | 74/498 |
| 3,525,362 | 8/1970 | Briggs | 91/375 A X |

FOREIGN PATENTS OR APPLICATIONS

| 984,289 | 4/1949 | France | 74/422 |
| 1,186,005 | 11/1957 | France | 74/422 |
| 765,883 | 1/1957 | Great Britain | 74/422 |
| 1,006,297 | 9/1965 | Great Britain | 74/498 |

OTHER PUBLICATIONS

Von Eberhorst, German application 1,073,879, Jan. 21, 1960

*Primary Examiner*—Milton Kaufman
*Attorney*—Larson, Taylor and Hinds

[57] ABSTRACT

Rack-and-pinion steering mechanism for a motor vehicle, comprising a rack housing having a radial projection thereon, and resilient means arranged on opposite sides of the outward projection, the resilient means on each side of the outward projection being located between the outward projection and a part separate from the rack housing, the arrangement being such that when the pinion is rotated to move the rack the resilient means on one side of said outward projection will be compressed to provide, in effect, lost-motion between the pinion and the rack to a varying degree according to the amount of rotation of the pinion, so varying the steering ratio.

14 Claims, 2 Drawing Figures

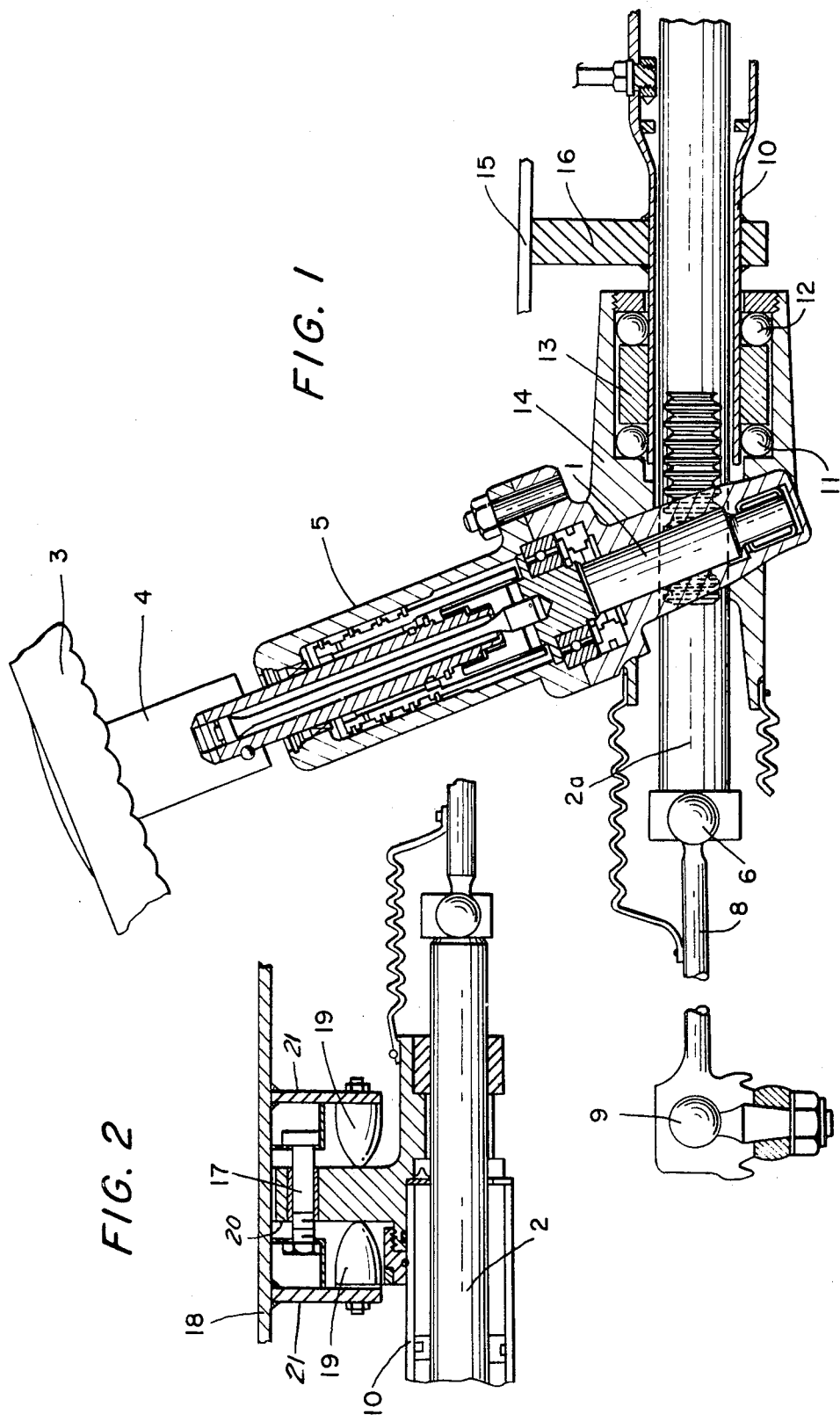

STEERING ARRANGEMENTS FOR MOTOR VEHICLES

This invention relates to steering arrangements for motor vehicles.

According to the present invention a steering arrangement has the following combination of features:
a. a pinion engages a toothed rack and is adapted to be rotated by a steering wheel;
b. the rack has at least one end adapted to be connected to a steering linkage;
c. the rack is slidable within a housing which is adapted to be mounted on a vehicle chassis by a mounting;
d. the mounting incorporates at least one resilient member such that rotation of the pinion from a dead-center position causes compression of the resilient member and movement of the housing relatively to the chassis.

How the invention may be carried out will now be described with reference to the accompanying drawings in which:

FIG. 1 is a fragmentary sectional view of a first embodiment of the invention; and FIG. 2 is a fragmentary sectional view of a second embodiment of the invention.

FIGURE 1

A motor vehicle steering arrangement includes a pinion 1 which engages a toothed rack 2 and is rotatable by a steering wheel 3 through a steering column 4 and a rotary valve 5.

The rack 2 carries an inner ball joint 6 at its end 2a and the ball joint is connected to a wheel lever 7 through a rod 8 and outer ball joint 9. The other end (not shown) of the rack 2 may or may not be connected in a similar manner to a similar steering linkage.

The rack 2 carries a piston (not shown) which is slidable in a housing 10 in which the rack 2 is located, the housing 10 in this instance also forming the power cylinder for power assistance of the rack 2.

Pressurized liquid is fed to the power cylinder through the rotary valve 5 in response to rotation of the pinion to urge the rack either to the right or left, as viewed in the drawing.

In known rack and pinion steering arrangements the housing 10 and/or valve 5 are secured rigidly to the chassis, or equivalent, of the motor vehicle. If they are secured in what cannot strictly be considered a rigid manner, i.e. by the interposition of a rubber mounting, the purpose and effect of such a mounting is not such as to alter the steering characteristics of the arrangement.

The essence of the present invention is the inclusion of a lost-motion means including a resilient member, of rubber or synthetic plastics for example, which will result in some of the steering effort applied by the pinion to the rack causing movement of the housing relatively to the chassis instead of movement of the rack relatively to the chassis, i.e. in effect there will be "lost-motion" between the pinion and the rack.

The characteristics of this "lost-motion" can be predetermined by appropriate shaping and dimensioning of the resilient member or members. Thus, for example, the resilient member or members can be constructed so that the steering ratio will vary from being relatively low at the dead-center position of the steering wheel to being relatively high at the full-lock position of the steering wheel.

In the embodiment of FIG. 1 a lost-motion means comprises two circular cross-section annuli of rubber 11 and 12 and a projection 13 extending radially outwards of housing 10. Annuli 11 and 12 are interposed between a surface of projection 13 of the housing 10 and a mounting 14 on which the valve 5 is carried. The housing 10 is secured rigidly to the vehicle chassis or equivalent, 15 by a second mounting 16.

Thus, when the pinion 1 is rotated at least some of the effort is taken up in compressing one or other of the annuli 11 or 12, depending on the direction of rotation, instead of in moving the rack relatively to the vehicle chassis or equivalent.

This amount of "lost-motion" will be greatest at the dead-center position and as the pinion turns further from the dead-center position the annulus will become more compressed and thus less resilient. The net result will be that the steering arrangement has a lower steering ratio at or near the dead-center position than at the full-lock positions. Thus, the "dead-centre" or "on-centre" sensitivity can be reduced without any adverse effect on the overall steering ratio.

FIGURE 2

In this embodiment the housing 10 for the rack 2 has a projection extending radially outwards therefrom that comprises a mounting bracket 20 which is slidable on a bolt 17 carried by the vehicle chassis 18, but its sliding movement is constrained by two substantially conical rubber stops 19 mounted on a supporting bracket 21 also carried by the chassis 18.

When the pinion (not shown) is rotated part of its effort is taken up in compressing one or other of the stops 19, as in the embodiment of FIG. 1.

What we claim is:

1. A rack and pinion steering mechanism for a motor vehicle having a chassis, the mechanism comprising:
  a rack housing;
  a toothed rack mounted for longitudinal movement in said rack housing;
  a pinion in meshing engagement to said toothed rack so that rotation of said pinion imparts longitudinal movement to said toothed rack;
  and lost-motion means for providing lost-motion between said pinion and said toothed rack, said lost-motion means comprising a projection extending outwards of said rack housing and having a surface extending generally laterally from said rack housing, said projection being moveable relative to said rack, at least one resilient member, and means for mounting said resilient member in compressible relationship between said surface of said projection and a member moveable to a limited extent relative to said rack housing whereby rotation of said pinion from a dead-center position causes compression of said resilient member between said projection and said separate member thereby providing lost-motion between said rack and said pinion for varying the steering ratio, the extent of motion of said member relative to said rack housing being dependent upon the compression of said resilient member and establishing the amount of said lost-motion.

2. A steering mechanism in accordance with claim 1 in which said lost-motion means includes two resilient members, the first resilient member being compressed by rotation of said pinion from the dead-center position in a first direction and the second resilient member being compressed by rotation of said pinion from the dead-center position in the other direction.

3. A steering mechanism in accordance with claim 2 in which each resilient member comprises an annulus, said annulus being circular in cross-section.

4. A steering mechanism in accordance with claim 2, in which each resilient member comprises an annulus, said annulus being substantially conical in cross-section.

5. A rack and pinion steering mechanism in accordance with claim 2 wherein said projection extends radially outwards of the rack housing and is rigidly connected thereto, said resilient members arranged on opposite sides of said outward projection, whereby when the pinion is rotated out of its center position the resilient means on one side of said outward projection will be compressed to provide, in effect, lost-motion between the pinion and the rack to a varying degree according to the amount of rotation of the pinion, thereby varying the steering ratio.

6. A rack and pinion steering mechanism according to claim 5, and further comprising a housing for the pinion, said resilient means being located between the said outward projection and the housing for the pinion.

7. A rack and pinion steering mechanism according to claim 6, wherein said outward projection comprises a collar mounted on the rack housing and said resilient means comprise elastomeric rings.

8. A rack and pinion steering mechanism according to claim 5, wherein said outward projection comprises a mounting bracket and wherein said resilient means are carried by mounting means adapted to be fixedly secured to a vehicle.

9. A rack and pinion steering mechanism according to claim 8, wherein said outward projection is slidably mounted on a pin carried by the mounting means so that the rack housing is capable of limited movement in the axial direction of the rack.

10. A rack and pinion steering mechanism according to claim 9, wherein said resilient means are of resilient material and have voids therein shaped and dimensioned to give each said resilient member a desired rate of compression with rotation of said pinion from the dead-center position.

11. A rack and pinion steering mechanism according to claim 8, wherein said resilient means are of substantially conical form.

12. A steering arrangement as claimed in accordance with claim 1, in which the resilient material has one or more voids in it each shaped and dimensioned to give the resilient member a desired rate of compression with rotation of the pinion from the dead-center position.

13. A rack and pinion mechanism according to claim 1 wherein said resilient member is positioned between a portion of said housing and a portion of said chassis.

14. A steering mechanism in accordance with claim 1 and further including a pinion housing for rotably mounting said pinion, one only of said rack housing and said pinion housing moving relative to said chassis upon rotation of said pinion from a dead-center position; and wherein said resilient member has a resiliency such that as the pinion is rotated from the dead-center to a full-lock position, there is progressively less movement of said one only of said rack housing and said pinion housing relative to the chassis per unit rotation of the pinion.

* * * * *